United States Patent Office 3,425,044
Patented Jan. 28, 1969

3,425,044

SELECTING SYSTEM FOR MAGNETIC CORE STORES

Pierre Alfred Ferrier, Villebon, and Marc Charles Joseph Lesueur, Chaville, France, assignors to Compagnie des Machines Bull (Societe Anonyme), Paris, France Filed June 12, 1963, Ser. No. 287,428
Claims priority, application France, June 18, 1962, 901,069
U.S. Cl. 340—174 2 Claims
Int. Cl. G11b *5/00*

Figure 1:
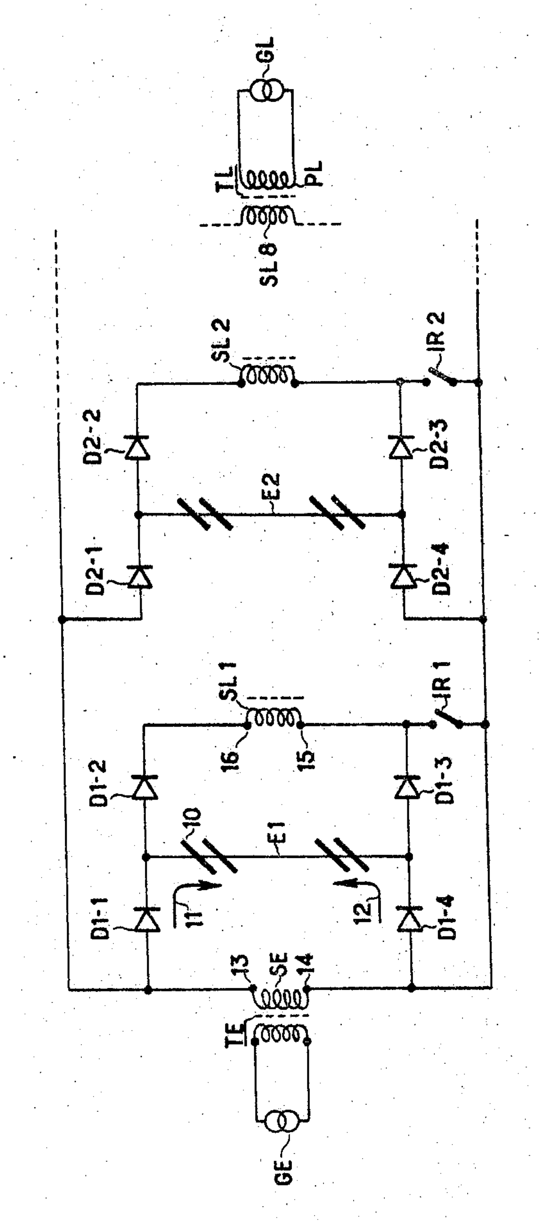

The present invention relates to magnetic stores composed of bistable elements and more especially to a selecting system associated thereto.

Matrix stores are at present constructed with high-remanence magnetic cores which are in themselves economical and of small overall dimensions. Unfortunately, it is the ancillary members, such as switches, current generators and logical circuits, which are ultimately found to be the most costly and the most bulky.

With a view to economy, it has been sought to provide a store unit by means of a number of square matrices, which in combination are equivalent to a plane rectangular matrix. This arrangement is favourable to a reduction in the number of ancillary members, but is still not sufficient.

In addition, by reason of the fact that only one winding is provided for the energisation of a series of cores (for example of a column) for the writing and for the reading, the cost and the overall dimensions of the matrix itself are not much reduced, and the problem of selectively controlling the many windings of a store matrix, each of which is regarded as an inductive impedance, is not thereby simplified.

The present invention has for its object to provide a rectangular matrix in accordance with the above-stated principles and in association with a selecting system, with which it is possible to provide an economical construction by simultaneously reducing the number of ancillary members, the overall dimensions and the energy consumption. These objects are achieved by the judicious association of semiconductor diodes and transformers which are constantly connected to the energising windings of the matrix, with a minimum number of switches and generators.

According to one aspect of the invention, there is provided an arrangement for the selective energisation of one of a number *n* of inductive impedances with two terminals, wherein each impedance is associated with four diodes in such a manner that each impedance is connected between the cathodes of a first pair of said diodes and between the anodes of a second pair of said diodes, and provided with a first transformer having a secondary winding for generating a current impulse of a determined polarity and parallel connected to the first homologous pairs of these diodes associated with the *n* impedances, a second transformer having a number *n* of secondary windings for simultaneously generating a current impulse of opposite polarity, each secondary being connected to one of said second pairs of diodes of the associated impedance, and a number *n* of switches, each being associated with one of the secondaries of said second transformer for connecting, when closed, a terminal of a given polarity of this secondary to the terminal of opposite polarity of the secondary winding of said first transformer, with the result that the closure of one switch permits two current impulses of opposite directions to pass in the selected impedance.

According to a further feature of the invention, there is provided an arrangement for the selective energisation of one of a plurality of inductive impedances with two terminals, these impedances being divided into N groups of *n* impedances, wherein each impedance is associated with four diodes in such a manner that each impedance is connected between the cathodes of a first pair of said diodes, and between the anodes of a second pair of said diodes and provided with a first transformer having N secondary windings for generating simultaneously a current pulse of a determined polarity, each of these secondaries being parallel connected to the first pairs of diodes associated with the impedances of a distinct group; a second transformer having *n* secondary windings for generating simultaneously a current impulse of opposite polarity, each of these secondaries being parallel connected to the second pairs of diodes associated in each of the N groups with the impedances of distinct ranks from 1 to *n*, a number N of group switches, each being able, when closed, to link a common conductor to a terminal of a given polarity of one of the secondaries of said first transformer, and a number *n* of rank switches, each being able, when closed, to link said common conductor to a terminal of an opposite polarity of one of the secondaries of said second transformer, with the result that the simultaneous closure of one group switch and one rank switch permits two current impulses of opposite directions to pass in the selected impedance.

The extension to a matrix of N groups of *n* column windings is immediate and consists in providing the first transformer with N secondary windings, in a proportion of one per group, and in providing in addition N group switches.

Figure 2:
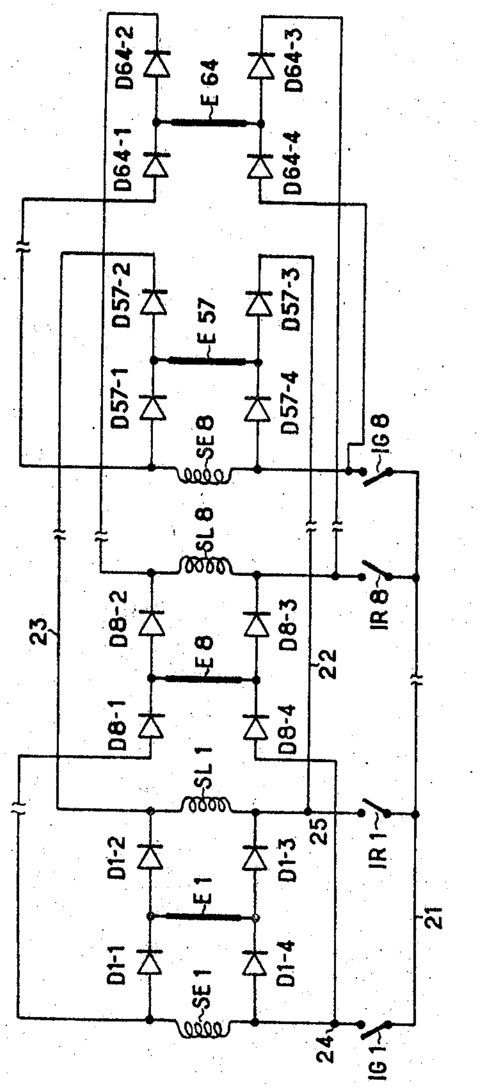
Figure 4:
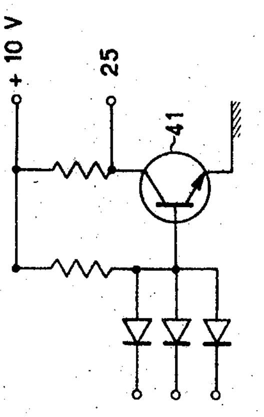
Figure 3:
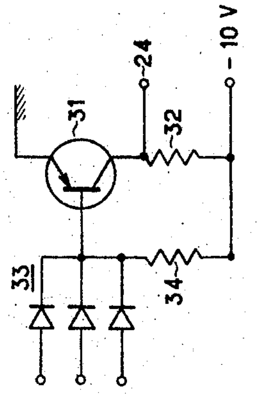

For a better understanding of the invention and to show how it may be carried into effect, the same will now be described by way of example with reference to the accompanying drawings, in which:

FIGURE 1 illustrates a store arrangement in which there is shown a group of columns of magnetic cores, FIGURE 2 illustrates a store arrangement composed of a number of store groups, and FIGURES 3 and 4 illustrate transistor switches adapted to be used in a particular construction.

Since the magnetic cores of a matrix store may be regarded as being distributed in rows and columns, FIGURE 1 illustrates a number of core columns. In accordance with a frequent usage of plane matrices, each core column may be assigned to the storage of a character, letter, digit or other encoded symbol. Another column may comprise, for example, eight cores if it is desired to reserve eight code positions for the characters to be recorded.

The cores 10 of each column are magnetically coupled to a winding or conductor E1, E2, etc. Each winding is shown as a simple conductor, but it is obvious that it may be composed of a number of multiturn coils, each coil being formed on a separate core.

For the writing of a character in a column of cores, it is necessary to pass a current of predetermined strength through the corresponding column winding, for example in the direction of the arrow 11. Taking into account the number of turns of a coil, and if a current +I is necessary for changing over the magnetic state of a core, the current through the column winding selected must be +2I/3. The matrix also comprises eight row windings, which have been omitted from the drawing for the sake of simplicity. In order to write a binary 1 in the core in a predetermined code position, the corresponding row winding must carry a current +2I/3. There also exists a bias winding (not shown), which extends through all the cores of the matrix and through which there continuously flows a current of strength —I/3. There further exists reading-output windings, but it is unnecessary to show them for an understanding of the invention.

Each column winding E1, E2, etc., is connected by means of two diodes D1–1, D1–4; D2–1, D2–4, etc., to the terminals of the secondary winding SE of the transformer TE. The latter may be fed by the generator GE. Each column winding E1, E2, etc. is connected by means of two diodes D1–2, D1–3; D2–2, D2–3, etc., to the terminals of a separate secondary winding, such as SL1, SL2, etc., respectively. If the group comprises eight column windings E1 to E8, there are therefore provided eight secondary windings SL1–SL8, all wound on the core of a transformer TL. The latter comprises a single primary winding PL, which may be fed by the generator GL.

It will be seen that the eight column windings are included in eight closed loops having a common part, namely the secondary winding SE. On the other hand, each winding is also included in a closed loop separate from the others and comprising one of the associated secondary windings SL1 to SL8.

Moreover, there are provided eight switches IR1 to IR8 connected as indicated in the diagram, only the switches IR1 and IR2 being shown.

OPERATION

It will be assumed that it is desired to select the first core column by selective energization of the column winding E1. The switch IR1 is then closed. In the course of a storage cycle, the generators GL and GE are set in operation during the successive reading and writing phases. The writing phase may first be examined. When the generator GE is set in operation, a voltage pulse is set up across the terminals 13, 14 of the secondary winding SE. The polarity of this pulse is such that the terminal 13 is positive in relation to the terminal 14. The drive current necessary for the selection of the column then passes in the direction of the arrow 11 from the terminal 13, through the diode D1–1, the winding E1, the diode D1–3 and the closed switch IR1, and returns to the terminal 14. At this instant, only a negligible current flows through the diode D1–4, since the latter receives a bias in the direction of its inverse resistance, which is very high. On the other hand it is to be observed that the secondary winding SL1 is in parallel with the winding E1. However, although the diodes D1–2 and D1–3 are biassed in the direction of their low resistance, only a very weak parasitic current flows through the said secondary winding, because each reading secondary winding such as SL1 has a higher impedance than the winding E1 by reason of the fact that it has a larger number of turns and a larger core volume than the corresponding elements associated with a core column.

With regard to the unselected column windings, it will be appreciated that they can be traversed only by negligible currents, because almost all the potential difference due to the writing-selection pulse is set up across the terminals of the diodes taken in the inverse direction, such as D2–4, etc., since the switches IR2 to IR8 have remained open.

There will now be considered the reading phase, in the course of which the generator GL is rendered operative and a voltage pulse is set up across the terminals of each of the eight secondary windings SL1–SL8. The polarity of this pulse is such that, more especially, the terminal 15 of SL1 becomes positive in relation to the terminal 16. The current necessary for the selection of the column then passes in the direction of the arrow 12, from the terminal 15, through the switch IR1, the diode D1–4, the winding E1 and the diode D1–2 to the terminal 16. Only a negligible current flows through the diode D1–3, because the later is biassed in the direction of its inverse resistance, by the value of the voltage drop existing across the terminals of the diode D1–4, i.e., several tenths of a volt. For the same reasons as have been indicated in the foregoing, the current shunted by the secondary winding SE is too weak to be troublesome.

On the other hand, the currents which can flow through the unselected windings are negligible, because the individual loops always include a diode such as D2–3 which is biassed in the direction of its inverse resistance, and the loops connected to SE also include a diode such as D2–4 which is biassed in the same direction.

It is clear that if the polarity of the pulses set up at the secondary windings SE and SL1 to SL8 were reversed, it would be necessary to connect the switches differently. In this case, a switch such as IR1 would have to be connected so as to form a direct link between the terminals 13 and 16, and not to form a direct link between the terminals 14 and 15, as indicated in FIGURE 1.

It is to be noted that a saving of switching means and of generators is already made in effecting the selection in a matrix of eight columns. This saving is much more marked in the case of a maxrix which can be divided into a number N of groups, each group comprising a number *n* of columns. This can be on examination of FIGURE 2. In this example $N=n=8$. Other values are obviously possible both for N and for *n*.

Since there are now eight groups of column windings, the writing transformer TE is provided with eight secondary windings SE1 to SE8, each of which is associated with one group of columns. Now, there are simply provided in addition eight group switches IG1 to IG8. When a group switch, for example IG1, is closed, it serves to connect one of the terminals of an associated writing secondry winding to a common conductor 21, to which there are also connected the rank switches IR1 to IR8.

In order to simplify the drawing, there are only shown in the first group the winding E1 with its four associated diodes D1–1 to D1–4, the winding E8 and its associated diodes D8–1 to D8–4, and in the eighth group only the winding E57 with the diodes D57–1 to D57–4 and the winding E64 with the diodes D64–1 to D64–4.

Considering, for example, the eighth group, the upper terminal of the writing secondary winding SE8 is connected to eight diodes D57–1, D58–1, . . . D64–1. Likewise, the lower terminal of the secondary winding SE8 is connected to eight diodes D57–4, D58–4, . . . D64–4.

Each of the reading secondary windings SL1 to SL8 is associated with eight column windings of like rank in the eight column groups. For example, the reading secondary winding SL1 is associated with the rank windings 1, namely E1, E9, E17, E25, E33, E41, E49 and E57. It can in fact be seen that the connections shown for this secondary winding are made by means of the diodes of like number, such as D1–2, D57–2 on the one hand and D1.3, D57–3 on the other hand.

The operation of the arrangement of FIGURE 2 is identical to that which has been explained in detail with reference to the arrangement of FIGURE 1. In order to select one of the 64 columns of the matrix, it is now sufficient to close a group switch and a rank switch.

It will be assumed that it is necessary to select the column windings E57. The switches IG8 and IR1 are then closed. During the reading phase, the pulse set up across the terminals of the secondary winding SL1 finds a circuit comprising the switch IR1, the common conductor 21, the switch IG8, the diode D57–4, the winding E57, the diode D57–2 and the conductor 23. During the writing phase, the pulse set up across the terminals of the secondary winding SE8 finds a circuit comprising the diode 57–1, the winding E57 in the opposite direction to the preceding one, the diode D57–3, the conductor 22, the switch IR1, the common conductor 21 and the switch IG8.

FIGURES 3 and 4 show possible constructional forms for the group switches and the rank switches respectively.

The group switch (FIGURE 3) comprises essentially a transistor 31 of the PNP type, of which the residual collector current can flow through the resistance 32. An AND circuit 33 comprises three diodes and is completed by the base resistance 34. The said AND circuit serves to decode the group address, which is supplied by a plurality of trigger circuits, in a manner well known in the existing art, which therefore need not be specified. It will be recalled that if the address applied to the inputs of the AND circuit is not that provided for by the switch in question, at least one of the diodes is traversed by a sufficient current to render the base of the transistor more positive than the emitter, so that the transistor is equivalent to an open switch. On the other hand, as soon as the address applied is that provided for by the switch, the three terminals are then negative, the three diodes are nonconductive and the base current determined by the resistance 34 is sufficient to produce saturation of the transistor 31. In this state, the internal resistance of the latter is very low, so that it may be regarded as a closed switch. The collector is connected to a terminal 24, which is also shown in FIGURE 2, for the first group.

A rank switch (FIGURE 4) is of like structure, except that the transistor 41 is of the NPN type, that the diodes of the AND circuit are oriented in the opposite directions and that the base and collector resistances are connected to a unidirectional-voltage source of +10 v. instead of −10 v. The collector of the transistor is conected to a terminal 25 which is also shown in FIGURE 2, in the case of the switch IR1.

Examination of the selecting system according to FIGURE 2 shows a small number of switching members employed. On the other hand, use is made of a fairly large number of germanium crystal diodes. However, the latter are very cheap, especially if the energising currents to be controlled are of the order of several tenths of a milliampere.

A very distinct economic advantage arises out of the fact that only two current generators are necessary. Since it is only for the switching of the latter that the control members must operate at high speed and with a high performance, it is clear that much is gained from the fact that only two such members have to be controlled. An access time of two microseconds may currently be obtained both in writing and in reading. For the switches, use may be made of medium-performance transistors, since they each control only a current of about 60 ma. Each winding coupled to a separate store core is composed of five turns in order to obtain a magnetic field corresponding to 0.3 ampere-turn. Either of the transformers may be made with a high-frequency ferrite toroidal core having a cross sectional area of 21 mm.$^2$ and a mean circumference of 56 mm. in length.

What is claimed is:

1. A circuit arrangement for the selective energisation of one of N×$n$ inductive impedances, each with two ends, the numbers N or $n$ being greater than two, comprising:

a number N of groups each of a number $n$ of such impedances, a first transformer with a core of nonremanent material, whose primary can receive a pulse from a first pulse generator and bearing a number N of secondaries, each with first and second terminals, a second transformer with a core of nonremanent material, whose primary can receive a pulse from a second pulse generator and bearing a number $n$ of secondaries, each with first and second terminals, as many sets of four diodes as there are inductive impedances, each set being assigned to a distinct impedance, in each of said groups, said first end of each impedance being connected through a first diode of its set to the first terminal of a corresponding secondary of said first transformer, and through a second diode of its set to the first terminal of one of the secondaries pertaining to said second transformer; and the second end of each impedance being connected through a fourth diode of its set to the second terminal of the same secondary of said first transformer and through a third diode of its set to the second terminal of said one secondary pertaining to said second transformer, in such a manner that each secondary of said second transformer is parallel-connected to the N impedances of same rank of the several groups through distinct pairs of diodes, a common conductor, a number N of "group" switches, each being associated with a different secondary of said first transformer for connecting, when closed, a determined terminal (e.g. the second one) thereof to said common conductor, and a number $n$ of "rank" switches, each being associated with a different secondary of said second transformer for connecting, when closed, a corresponding terminal (e.g. the second one) thereof to said common conductor.

2. A circuit arrangement as claimed in claim 1, wherein each of said switches includes one transistor, characterised in that the transistor included in a "group" switch is of a type of conductivity complementary to that of the transistor included in a "rank" switch.

References Cited

UNITED STATES PATENTS

| | | | |
|---|---|---|---|
| 3,222,658 | 12/1965 | Bruce et al. | 340—174 |
| 3,008,128 | 11/1961 | Powell | 340—174 |
| 2,931,016 | 3/1960 | Bonn et al. | 340—174 |

BERNARD KONICK, *Primary Examiner.*

PHILIP SPERBER, *Assistant Examiner.*

U.S. Cl. X.R.

340—166